US010662987B2

(12) United States Patent
Brzozowski et al.

(10) Patent No.: US 10,662,987 B2
(45) Date of Patent: May 26, 2020

(54) PHASE TAILORING FOR RESONANT FLOW DEVICES

(71) Applicant: The Boeing Company, Chicago, IL (US)

(72) Inventors: Daniel Paul Brzozowski, Ladue, MO (US); Steven Fulton Griffin, Kihei, HI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/671,367

(22) Filed: Nov. 1, 2019

(65) Prior Publication Data
US 2020/0096023 A1 Mar. 26, 2020

Related U.S. Application Data

(63) Continuation of application No. 15/344,520, filed on Nov. 6, 2016.

(51) Int. Cl.
| | |
|---|---|
| *B64C 21/08* | (2006.01) |
| *F15D 1/00* | (2006.01) |
| *B64C 23/06* | (2006.01) |
| *B64D 43/02* | (2006.01) |

(52) U.S. Cl.
CPC ............ *F15D 1/0095* (2013.01); *B64C 21/08* (2013.01); *B64C 23/06* (2013.01); *B64D 43/02* (2013.01); *B64C 2230/04* (2013.01); *B64C 2230/18* (2013.01); *Y02T 50/166* (2013.01)

(58) Field of Classification Search
CPC ....... F15D 1/0095; B64C 21/08; B64C 23/06; B64D 43/02
See application file for complete search history.

(56) References Cited

U.S. PATENT DOCUMENTS

| | | | | |
|---|---|---|---|---|
| 5,957,413 A | * | 9/1999 | Glezer | B64C 21/08 244/208 |
| 6,412,732 B1 | * | 7/2002 | Amitay | B64C 23/005 244/200 |
| 6,821,090 B1 | * | 11/2004 | Hassan | B64C 23/04 244/130 |

(Continued)

OTHER PUBLICATIONS

Smith et al., "Controlled Interactions of Adjacent Synthetic Jets," 37th AIAA Aerospace Sciences Meeting and Exhibit, Jan. 11-14, 1999, Reno, NV, 23 pages.

(Continued)

*Primary Examiner* — Justin M Benedik
(74) *Attorney, Agent, or Firm* — Yee & Associates, P.C.

(57) ABSTRACT

A device including a resonant array of a plurality of synthetic jet generators where neighboring jet generators are coupled, resulting in the potential for constructive and destructive interference between jets of the plurality of synthetic jet generators depending on the relative phase of a corresponding plurality of drive signals to plurality of synthetic jet generators. The device also includes a controller configured to control the relative phase of the corresponding plurality of drive signals to effect a change in a first jet emitted by a first synthetic jet generator of the plurality of synthetic jets by changing a given phase of a second jet emitted by a second synthetic jet generator of the plurality of synthetic jet generators.

21 Claims, 7 Drawing Sheets

(56) References Cited

U.S. PATENT DOCUMENTS

| | | | |
|---|---|---|---|
| 8,937,424 B2 | 1/2015 | Griffin et al. | |
| 9,243,622 B2* | 1/2016 | Griffin | F04B 43/00 |
| 2007/0152104 A1* | 7/2007 | Cueman | B64C 21/00 |
| | | | 244/198 |
| 2008/0087771 A1* | 4/2008 | Boespflug | B64C 23/005 |
| | | | 244/207 |
| 2018/0231032 A1 | 8/2018 | Brzozowski et al. | |

OTHER PUBLICATIONS

Smith et al., "Vectoring of Adjacent Synthetic Jets," AIAA Journal, vol. 43, No. 10, Oct. 2005, 10 pages.
European Patent Office Extended Search Report, dated Feb. 23, 2018, regarding Application No. EP17187296.3, 8 pages.
Office Action, dated May 2, 2019, regarding U.S. Appl. No. 15/334,520, 14 pages.
Notice of Allowance, dated Aug. 20, 2019, regarding U.S. Appl. No. 15/344,520, 7 pages.

* cited by examiner

PHASE TAILORING FOR RESONANT FLOW DEVICES

CROSS-REFERENCE TO RELATED APPLICATION

This application is a continuation application of U.S. patent application Ser. No. 15/344,520, filed Nov. 6, 2016, now U.S. Pat. No. 10,605,280, issued Mar. 31, 2020, which is herein incorporated by reference.

BACKGROUND INFORMATION

1. Field

The present disclosure relates to array phasing to tailor spatial velocity profiles of synthetic jets.

2. Background

In aerospace applications, synthetic jets are used to help an aircraft fly more efficiently. Synthetic jets are generally formed by forcing a fluid flow through a small opening, typically in a pumped or cyclic manner. Synthetic jets may also be produced by periodic ejection and suction of the fluid from an opening or orifice, the ejection and suction being induced by movement of a diaphragm inside a cavity.

SUMMARY

The illustrative embodiments provide for a device including a resonant array of a plurality of synthetic jet generators where neighboring jet generators are coupled. The device also includes a controller configured to control a relative phase of a corresponding plurality of drive signals to effect a change in a first jet emitted by a first synthetic jet generator of the plurality of synthetic jet generators by changing a given phase of a second jet emitted by a second synthetic jet generator of the plurality of synthetic jet generators, wherein the given phase is different from a phase of the first jet emitted by the first synthetic jet generator of the plurality of synthetic jet generators.

The illustrative embodiments also provide for a system for phase tailoring resonant flow devices including a data processing system using a controller configured to transmit a first drive signal to a first synthetic jet generator to produce a first synthetic jet and transmit a second drive signal to a second synthetic jet generator to produce a second synthetic jet. The controller is also configured to control a combined operation of the first synthetic jet and the second synthetic jet by adjusting a phase difference between the first drive signal and the second drive signal.

The illustrative embodiments also provide for a computer program product for training a primary machine learning model including a computer-readable storage media and first program code, stored on the computer-readable storage media, for generating a first synthetic jet using a first synthetic jet generator. The computer program product also includes second program code, stored on the computer-readable storage media, for generating a second synthetic jet using a second synthetic jet generator that is coupled to the first synthetic jet generator. The computer program product also includes third program code, stored on the computer-readable storage media, for controlling, using a controller coupled to both the first synthetic jet generator and the second synthetic jet generator, the first synthetic jet and the second synthetic jet.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that active flow control (AFC) is technique used to modify the airflow over a wing or other body immersed in a fluid by injecting fluid momentum on or near the surface, such as, for example, an outer mold line of a wing. Active flow control (AFC) allows for increased aerodynamic performance either in off-design conditions or on aerodynamic surfaces which were optimized for non-aerodynamic considerations, such as internal components, structural, and the like.

The illustrative embodiments also recognize and take into account that a number of flow control actuators have been proposed to inject this momentum into the flow. Historically, these systems have relied on a high pressure air supply, such as bleed air from an engine. As modern aircraft move to all-electric systems, this air supply is not readily available. For that reason, the illustrative embodiments also recognize and take into account that the all-electric synthetic jet actuator (SJA) of the illustrative embodiments is a particularly attractive option to achieve the flow control input.

An effective active flow control strategy, such as mitigating separation over a flap, may require adjustment of the actuation input over the actuated region. The actuation input distribution across the region may be invariant in time, which is open loop actuation, but more likely will need to be varied in response to changing aerodynamic conditions, which is closed loop actuation.

The illustrative embodiments also recognize and take into account that current methods of adjusting actuation input require amplitude tailoring of the harmonic drive signal to the synthetic jet actuators. The illustrative embodiments also recognize and take into account that this type of control is an unattractive solution as it requires continuous adjustment of the gain of a set of high voltage signals, and it may not yield the desired velocity profile. Thus, the illustrative embodiments provide for a method of adjusting the spatial distribution of the actuation input by adjusting only the relative phase of the drive signal between jets, while operating at a constant voltage amplitude. The constant amplitude varying phase technique of the illustrative embodiments is a potentially simpler electrical circuit.

The illustrative embodiments also recognize and take into account that the authors have observed, for an array of resonant synthetic jets, that the phase relationship between the drive signal to each of the actuators in the array can be used to tailor the velocity profile output of the array. A related observation made by the authors is that activating one of the synthetic jets in a resonant array will drive the neighboring synthetic jets at nearly sixty percent of the amplitude of the active jet. The illustrative embodiments also recognize and take into account that these observations enable velocity profile shaping by controlling the relative phase of constant amplitude drive signals to a resonant array of jets.

Stated differently, the illustrative embodiments provide for an array of resonant synthetic jets, wherein the phase relationship between the drive signal to each of the actuators in the array can be used to tailor the velocity profile output of the array. As noted above, activating one of the synthetic jets in a resonant array will drive the neighboring synthetic jets at nearly sixty percent of the amplitude of the active jet. These observations enable velocity profile shaping by controlling the relative phase of constant amplitude drive signals to a resonant array of jets.

As indicated above, the illustrative embodiments recognize and take into account that active flow control actuators may be adjusted to ensure effective performance and airflow control. Continuous adjustment of the gain of a set of high voltage signals may be required, and it may not yield the desired velocity profile. The adjustment can be accomplished once prior to installation (standard adjustment) or in real time.

As indicated above, adjusting actuation input of resonant flow control actuators (jets) requires amplitude tailoring to control the harmonic drive signal to the synthetic jet actuators. Also as indicated above, this technique is an unattractive solution as it requires continuous adjustment of the gain of a set of high voltage signals, and it may not yield the desired velocity profile.

As indicated above, the illustrative embodiments solve the issues described above by providing for a method of adjusting the spatial distribution of the actuation input by adjusting only the relative phase of the drive signal between jets, while operating at a constant voltage amplitude. Constant amplitude varying phase can be a simpler electrical circuit. For example, the phase adjustment may be accomplished with a digital delay or an analog circuit, such as a bridged-T delay equalizer. Other simple electrical circuits could be used. The authors have determined that it is easier to create a set of driven voltage signals that have the same amplitude and different phases, as opposed to creating a signal with the same phase and different voltages. Thus, the illustrative embodiments provide for phase tailoring for resonant flow devices.

Figure 1:
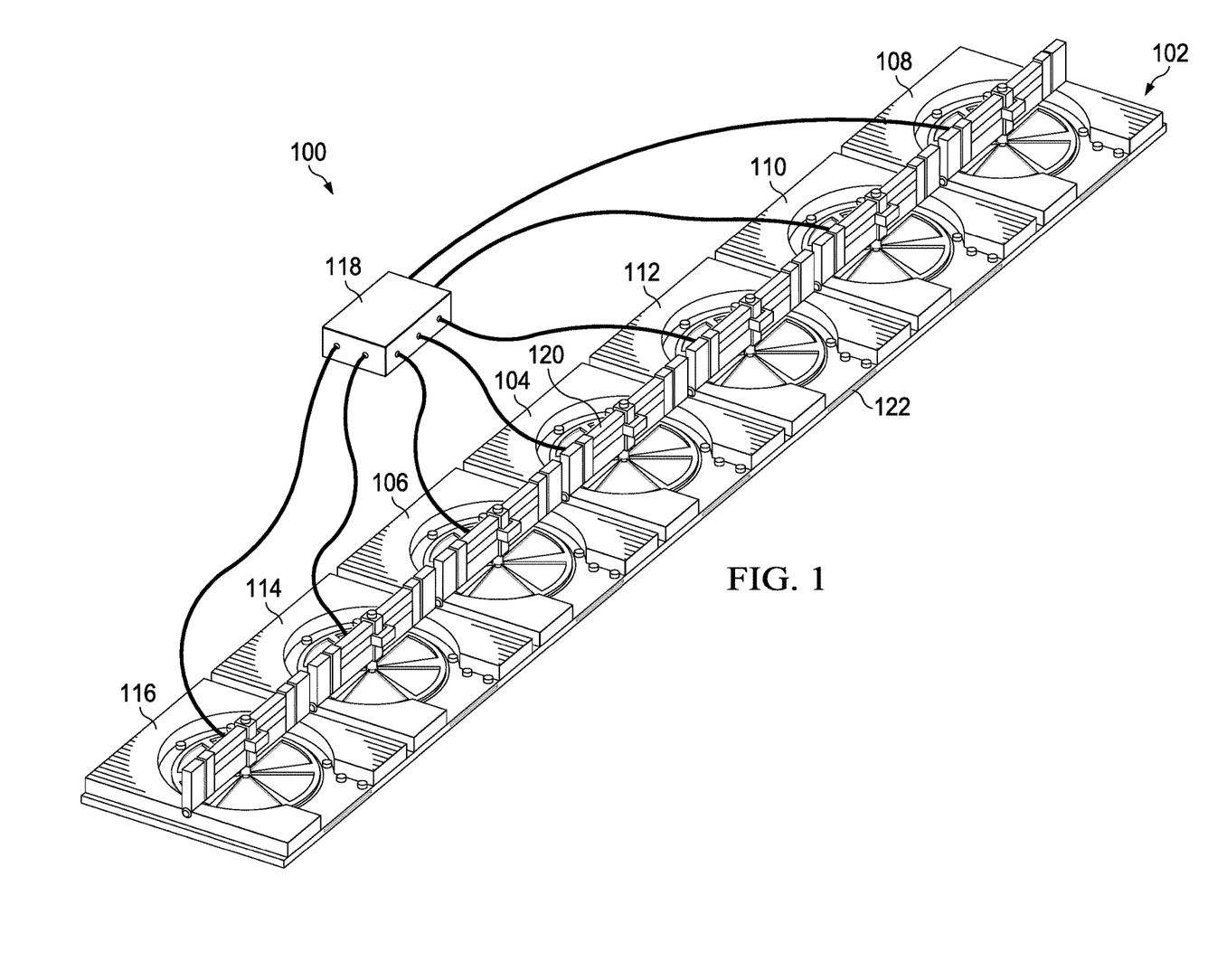
FIG. 1 is an illustration of a synthetic jet generator in accordance with an illustrative embodiment.

FIG. 1 is an illustration of a synthetic jet generator in accordance with an illustrative embodiment. Synthetic jet generator array 100 may include any of a number of, either custom or commercially available, synthetic jet generators. Synthetic jet generator array 100 includes line of synthetic jet generators 102, which in FIG. 1 has synthetic jet generator 104 and synthetic jet generator 106. Multiple additional synthetic jet generators may be present in line of synthetic jet generators 102, including but not limited to synthetic jet generator 108, synthetic jet generator 110, synthetic jet generator 112, synthetic jet generator 114, and synthetic jet generator 116.

Each synthetic jet generator is controlled using controller 118. Each synthetic jet generator may include an individual actuator, such as actuator 120 of synthetic jet generator 106. The actuators, such as actuator 120, drive the synthetic jets, typically by pumping a diaphragm, which in turn forces air into and out of synthetic jet generator 106. Typically, air or other fluid is forced through an aperture, such as aperture 122 of synthetic jet generator 106. Because the air is forced in and out at high velocity and at high frequency, repeating jets of air are forced out of aperture 122, with air drawn into aperture 122 between periods when air is forced out of aperture 122. Because of the frequency of repetition, to human perception, a single apparently continuous jet is formed. However, in actuality, multiple jets are ejected from aperture 122 at a high frequency. It is for this reason that these devices are referred to as "synthetic" jet generators.

The illustrative embodiments disclosed herein are directed towards controlling multiple linked synthetic jet generators, not towards any given single synthetic jet generator. In particular, the illustrative embodiments recognize and take into account that when linked synthetic jet generators are driven by a single controller, changing the phase of the electrical signal that drives the linked synthetic jet generators can change how any given synthetic jet generator operates. Thus, the illustrative embodiments provide for phase tailoring for resonant flow devices. This effect and how to control it are described further below with respect to FIG. 4 through FIG. 8.

Figure 2:
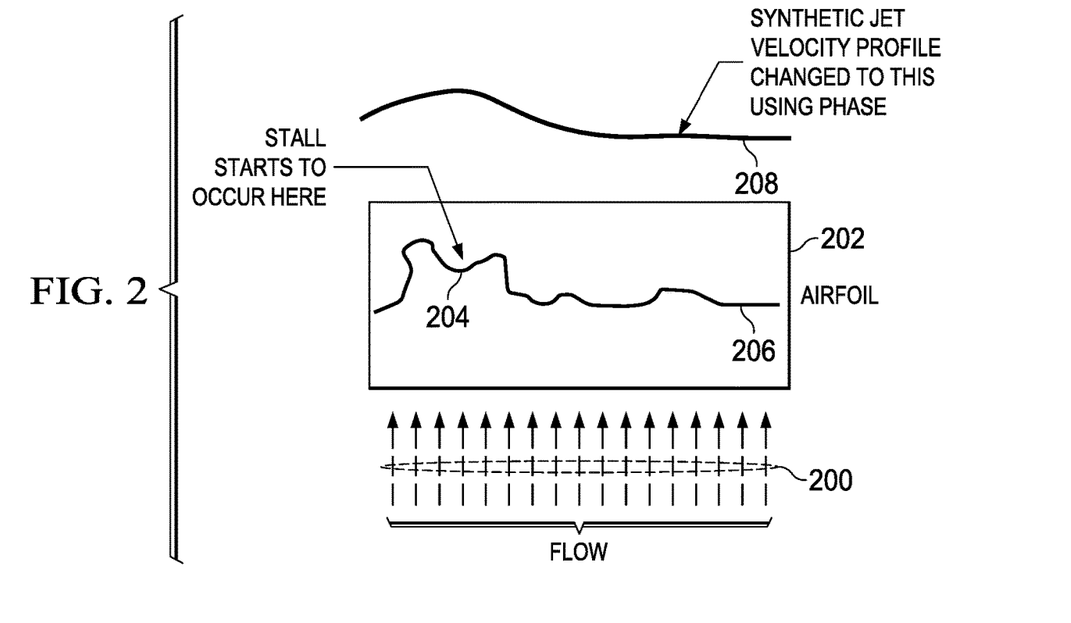
FIG. 2 is an illustration of an application of velocity profiling of a synthetic jet in accordance with an illustrative embodiment.
Figure 3:
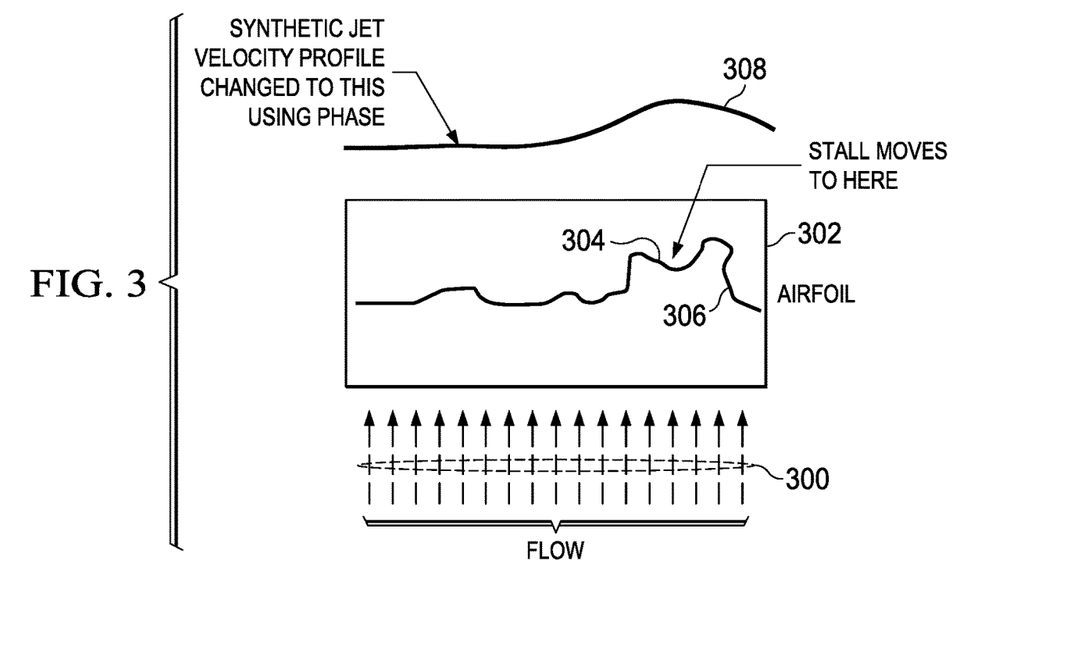
FIG. 3 is another illustration of an application of velocity profiling of a synthetic jet in accordance with an illustrative embodiment.

FIG. 2 is an illustration of an application of velocity profiling of a synthetic jet in accordance with an illustrative embodiment. FIG. 3 is another illustration of an application of velocity profiling of a synthetic jet in accordance with an illustrative embodiment. FIG. 2 and FIG. 3 should be considered together, and are variants of each other.

In an illustrative embodiment, velocity measurements of fluid flow 200 across air foil 202 were made using an array of two closely matched resonant synthetic jets, which could be, for example, synthetic jet generator 104 and synthetic jet generator 106 of FIG. 1.

The drive signal amplitude is the same for both synthetic jet generators, but the relative phase is changed from zero to 360 degrees in fifteen degree increments. This data is plotted in FIG. 4, below. At the initial phase of zero, a stall started to occur in the velocity profile, as indicated by area 204 of profile 206. However, by controlling the phase of the drive signal to the two synthetic jet generators, the synthetic jet velocity profile is changed to profile 208. Profile 208 is smoother than profile 206, and thus is considered more desirable for aerodynamic performance, such as air flow over the wing of an aircraft.

Likewise, in an illustrative embodiment, velocity measurements of fluid flow 300 across air foil 302 were made using an array of two closely matched resonant synthetic jets, which could be, for example, synthetic jet generator 104 and synthetic jet generator 106 of FIG. 1.

The drive signal amplitude is the same for both synthetic jet generators, but the relative phase is changed from 360 to zero degrees in fifteen degree increments. This data is plotted in FIG. 4, below. At the initial phase of 360, a stall started to occur in the velocity profile, as indicated by area 304 of profile 306. However, by controlling the phase of the drive signal to the two synthetic jet generators, the synthetic jet velocity profile is changed to profile 308. Profile 308 is smoother than profile 306, and thus is considered more desirable for aerodynamic performance, such as air flow over the wing of an aircraft.

Figure 4:
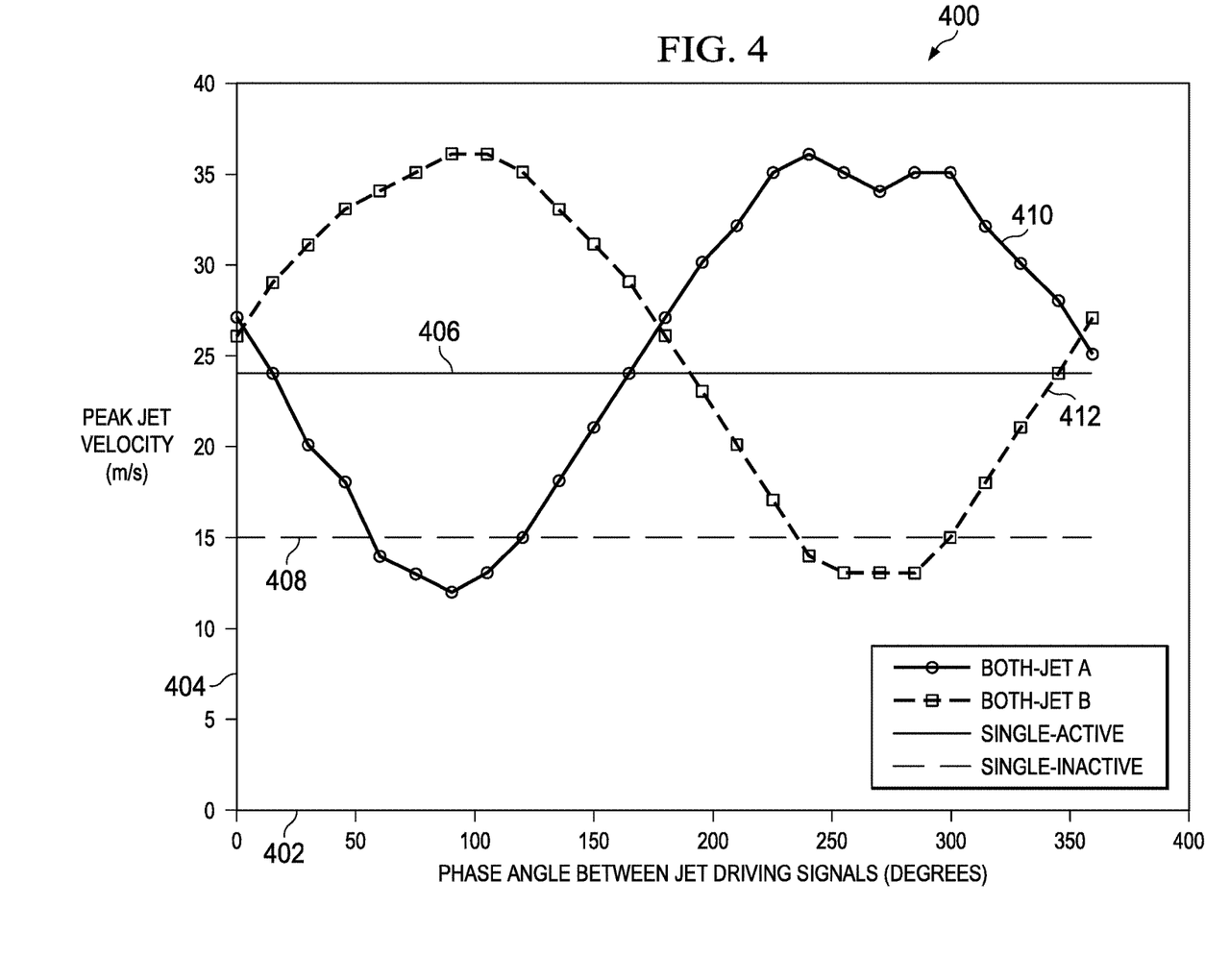
FIG. 4 is an illustration of a graph of measured velocity variation with phase for a synthetic jet in accordance with an illustrative embodiment.

FIG. 4 is an illustration of a graph of measured velocity variation with phase for a synthetic jet, in accordance with an illustrative embodiment. Graph 400 may be an example of data that results when synthetic jets, such as those in FIG. 1, are directed across an air foil, such as airfoil 202 and airfoil 302 in FIG. 2 and FIG. 3, respectively.

Graph 400 is a graph of peak jet velocity measured in meters per second, as shown on vertical axis 404, versus phase angle between jet driving signals in degrees, as shown on horizontal axis 402. Line 406 represents a single active jet, that being jet A of synthetic jet generator A. Line 408 represent a single active jet, that being jet B from synthetic jet generator B. Line 410 represents both jet A and jet B being active, and the effect on jet A of varying the phase of the drive signal on synthetic jet generator B. Line 412 represents both jet A and jet B being active, and the effect on jet B of varying the phase of the drive signal on synthetic jet generator A.

From graph 400, it is clear that the peak in velocity amplitude for jet A or jet B can be increased from a minimum of 12 m/s to a maximum of 36 m/s by adjusting the phase to 90 degrees or 270 degrees. It is also of interest to note that when the drive signal is applied to one of the jets resulting with an amplitude of 24 m/s, the other jet has an amplitude of 15 m/s with no drive signal. It is this coupling between resonant jets, that result in the ability to tailor the velocity profiles with phase. Finally, it is worth noting that at multiples of 180 degrees of phase, the velocity of each of the jets is around 27 m/s, which is noticeably higher than the 24 m/s achievable by a single jet.

Similar velocity profiling with a non-resonant, non-coupled array would require a higher power input to drive the device, indicating that the change in coupling with relative phase angles corresponds to a change in device efficiency, which is the jets' ability to convert electrical power into fluid power. Moreover, any realistic installation of synthetic jet actuators will inherently require mechanical coupling of adjacent actuators, which will cause this "crosstalk". Ignoring the phase relationship between devices may lead to unnecessarily diminished performance for any given power input.

The illustrative embodiments described herein may be varied. For example, this concept may be extended to any resonant flow device in which mechanical coupling exists between adjacent modules.

Figure 5:
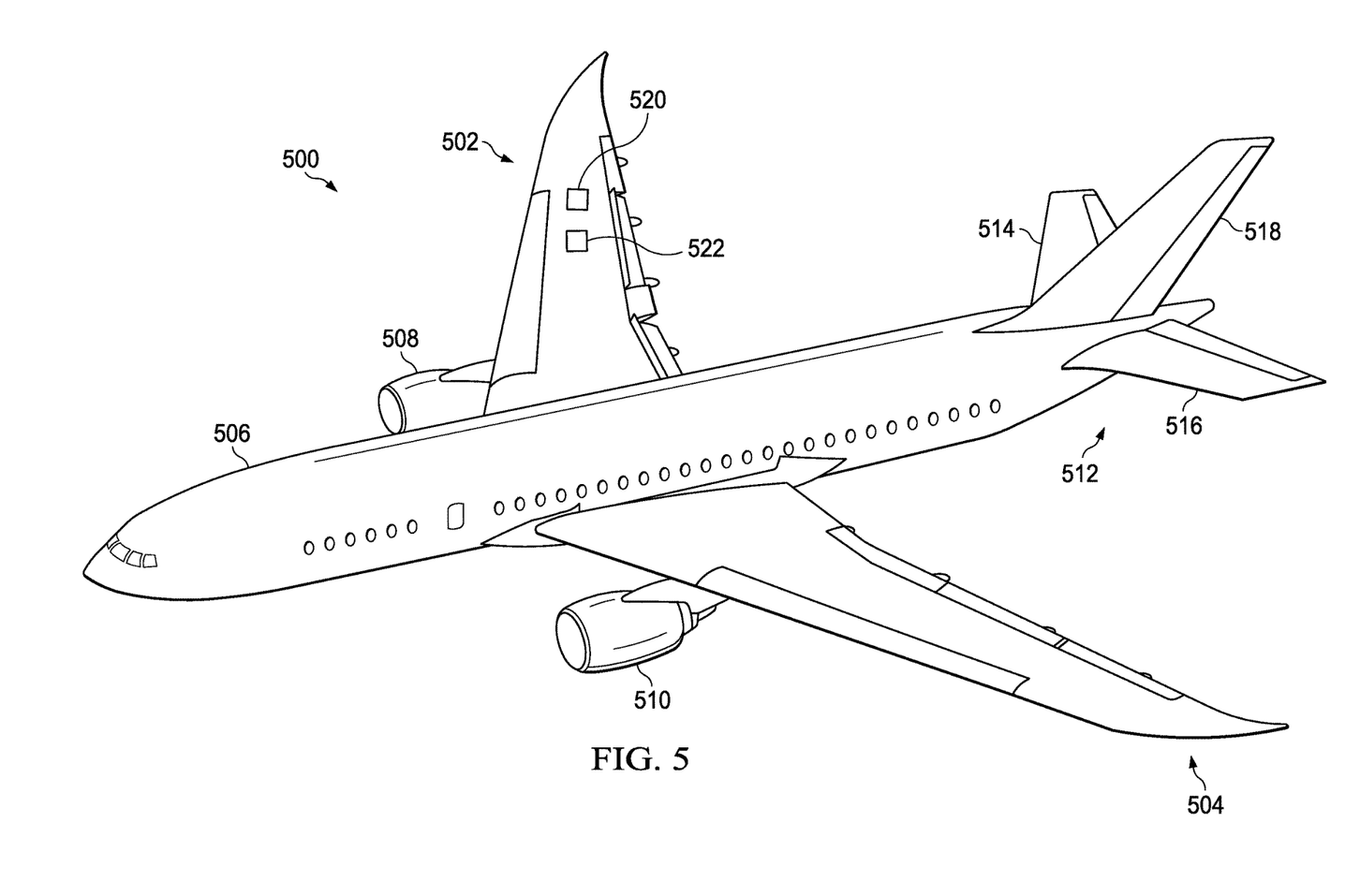
FIG. 5 is an illustration of an aircraft in accordance with an illustrative embodiment.

FIG. 5 is an illustration of an aircraft, in accordance with an illustrative embodiment. Aircraft 500 includes wing 502 and wing 504 attached to fuselage 506, engine 508 attached to wing 502, and engine 510 attached to wing 504. Engine 510 could also be attached to fuselage 506. Fuselage 506 has tail section 512. Horizontal stabilizer 514, horizontal stabilizer 516, and vertical stabilizer 518 are attached to tail section 512 of fuselage 506.

Figure 9:
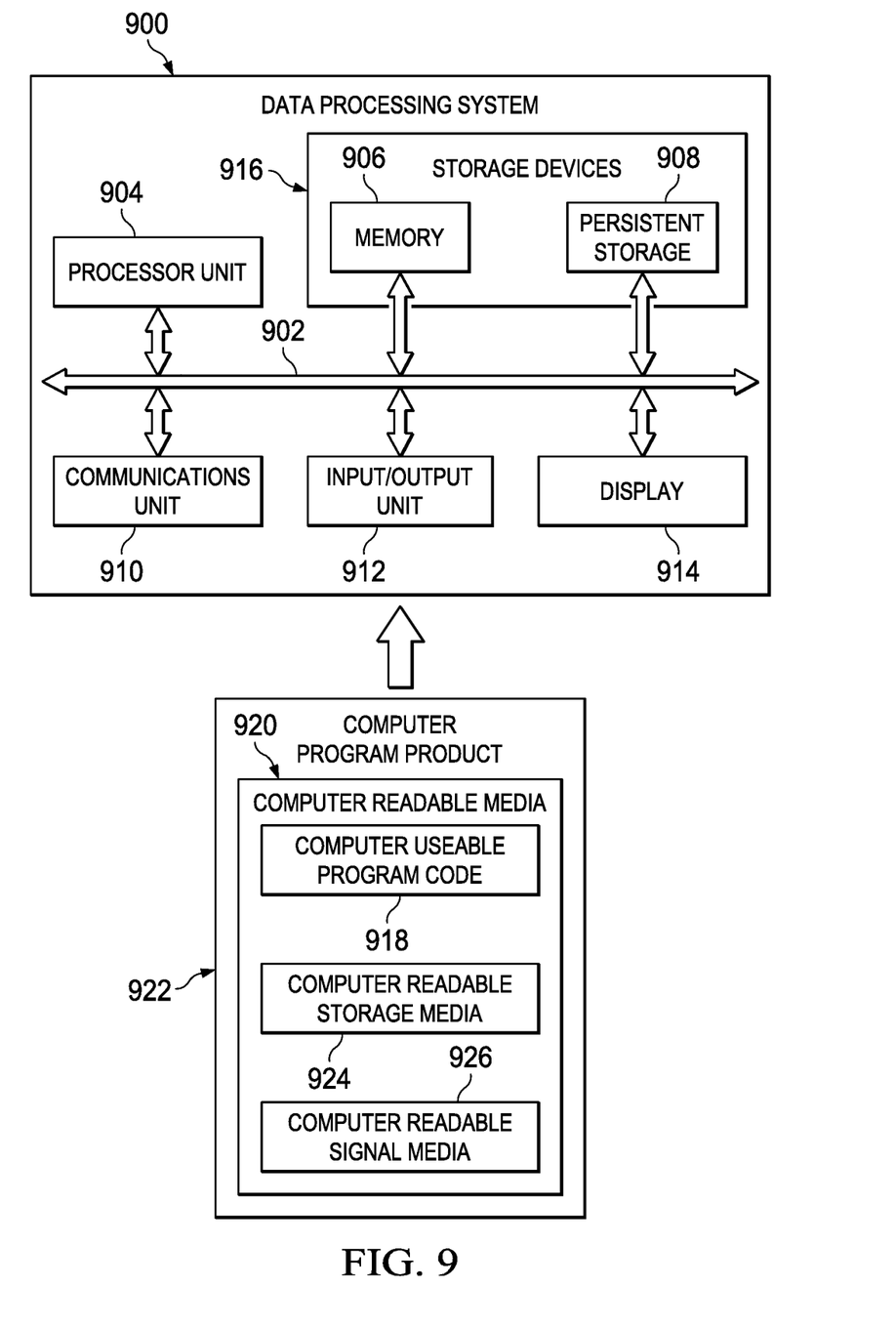
FIG. 9 is an illustration of a block diagram of a detection system in accordance with an illustrative embodiment.

A computer, such as data processing system 900 of FIG. 9, may be inside fuselage 506, in a cabin or cockpit, for example. This computer may store program code for executing any of the methods or techniques described, above or below, in order to automatically operate aircraft 500 using a synthetic jet generator, such as synthetic jet generator 520. The operation of synthetic jet generator 520 may be based on input provided by sensor 522, or some other sensor. For example, sensor 522 may be configured to detect local aerodynamic stall characteristics of a fluid flow on the body of aircraft 500.

Synthetic jet generator 520 may be any of the synthetic jet generators described with respect to FIG. 1 through FIG. 4, or FIG. 5 and FIG. 6. Method 800 of FIG. 8 may be performed by synthetic jet generator 520. The purpose of synthetic jet generator 520 may be to aid aircraft 500 to fly more efficiently, such as by affecting the airflow around wing 502 or wing 504 in a manner that increases fuel efficiency, maneuverability, or both.

Figure 6:
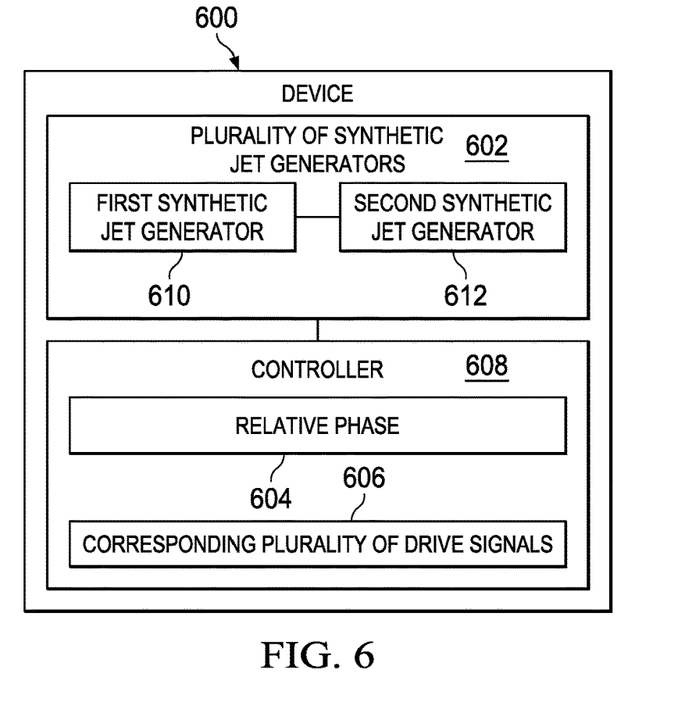
FIG. 6 is an illustration of a block diagram of a device including a synthetic jet generator in accordance with an illustrative embodiment.

FIG. 6 is an illustration of a block diagram of a device including a synthetic jet generator, in accordance with an illustrative embodiment. Device 600 may be an example of a set of synthetic jet generators, such as those shown in FIG. 1.

Device 600 includes a resonant array of plurality of synthetic jet generators 602 where neighboring synthetic jet generators are coupled, resulting in the potential for constructive and destructive interference between the jets of plurality of synthetic jet generators 602 depending on relative phase 604 of corresponding plurality of drive signals 606 to plurality of synthetic jet generators 602. Device 600 also includes controller 608, configured to control relative phase 604 of corresponding plurality of drive signals 606 to effect a change in a first jet emitted by first synthetic jet generator 610 of plurality of synthetic jets generators 602 by changing a given phase of a second jet emitted by second synthetic jet generator 612 of plurality of synthetic jet generators 602.

Device 600 may be varied. For example, in an illustrative embodiment, the given phase may be configured to cause a larger amplitude in each of the jets than what is possible with a single jet. In another illustrative embodiment, a resulting velocity profile of the jets is shaped depending on the relative phases to each jet generator of plurality of synthetic jet generators 602. In still another illustrative embodiment, the second jet will only change when first synthetic jet generator 610 is driven.

In yet another illustrative embodiment, device 600 also includes an aircraft, such as aircraft 500 shown in FIG. 5. Aircraft 500 may be connected to plurality of synthetic jet generators 602. A sensor, such as sensor 522 of FIG. 5, may be connected to aircraft 500 and configured to detect local aerodynamic stall characteristics of a fluid flow on the body of aircraft 500. In this case, controller 608 may be further configured to adjust the first jet by changing a phase angle of the second jet generator to mitigate the local aerodynamic stall characteristics.

The illustrative embodiments described with respect to FIG. 6 may be further varied. Thus, the illustrative embodiments described with respect to FIG. 6 do not necessarily limit the claimed inventions.

Figure 7:
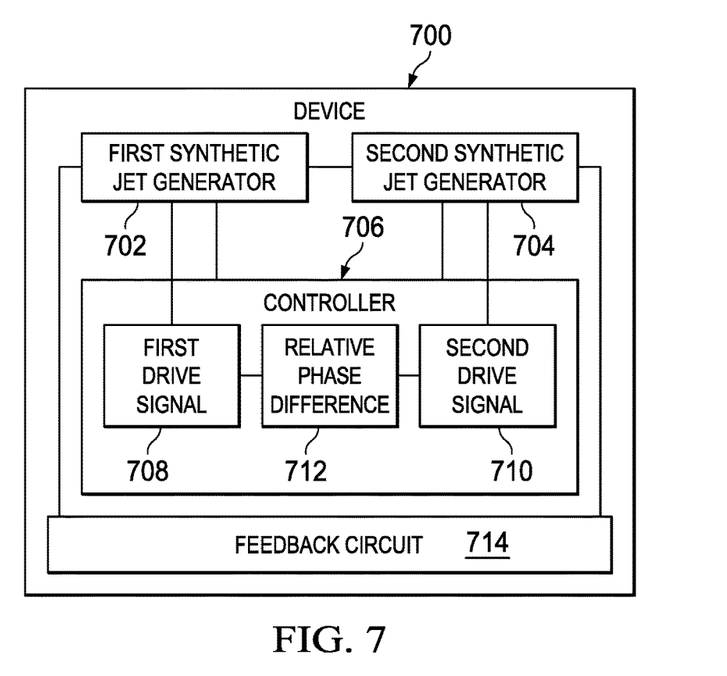
FIG. 7 is another illustration of a block diagram of a device including a synthetic jet generator in accordance with an illustrative embodiment.

FIG. 7 is another illustration of a block diagram of a device including a synthetic jet generator in accordance with an illustrative embodiment. Device 700 is a variation of any of the synthetic jet generators of synthetic jet generator array 100 of FIG. 1, or synthetic jet generator 600 of FIG. 6.

Device 700 includes first synthetic jet generator 702 configured to generate a first synthetic jet. Device 700 also includes second synthetic jet generator 704 coupled to first synthetic jet generator 702 and configured to generate a second synthetic jet.

Device 700 also includes controller 706 coupled to both first synthetic jet generator 702 and second synthetic jet generator 704. Controller 706 may be configured to transmit first drive signal 708 to first synthetic jet generator 702. Controller 706 also may be configured to transmit second drive signal 710 to second synthetic jet generator 704. Controller 706 also may be configured to control a combined operation of both first synthetic jet generator 702 and second synthetic jet generator 704 by controlling relative phase difference 712 between first drive signal 708 and second drive signal 710.

Device 700 may be varied. For example, in an illustrative embodiment the controller is further configured to control the operation of first synthetic jet generator 702 by controlling only relative phase difference 712. In a related illustrative embodiment, controller 706 may be further configured to control operation of first synthetic jet generator 702 by transmitting only second drive signal 710. In another related illustrative embodiment, device 700 also includes feedback circuit 714. Feedback circuit 714 may be coupled to first synthetic jet generator 702, second synthetic jet generator 704, and controller 706. In this case, controller 706 may be further configured to use a feedback signal from feedback circuit 714 to control first synthetic jet generator 702 and second synthetic jet generator 704 to produce a predetermined velocity profile of a combination of the first synthetic jet generator and the second synthetic jet generator.

In a related illustrative embodiment, device 700 may also include a housing containing the first synthetic jet generator, the second synthetic jet generator, and the controller. The housing may be, for example, synthetic jet generator 520 of FIG. 5. In this case, device 700 also includes an aircraft connected to the housing. The aircraft may be aircraft 500 of FIG. 5. Additionally, device 700 may also include a sensor connected to the aircraft and configured to detect local aerodynamic stall characteristics of a fluid flow on a body of the aircraft. The sensor may be sensor 522 of FIG. 5. In this case, the controller is further configured to mitigate the local aerodynamic stall characteristics by producing the predetermined velocity profile.

In a different illustrative embodiment, controller 706 is further configured to drive both first synthetic jet generator 702 and second synthetic jet generator 704 at a single constant voltage amplitude. In another illustrative embodiment, controller 706 may be further configured to increase both a first maximum velocity of the first synthetic jet and a second maximum velocity of the second synthetic jet by changing relative phase difference 712. In this case, relative phase difference 712 may be about 180 degrees. However, relative phase difference 712 may be any value between zero and 360 degrees.

The illustrative embodiments described with respect to FIG. 7 may be further varied. Thus, the illustrative embodiments described with respect to FIG. 7 do not necessarily limit the claimed invention.

Figure 8:
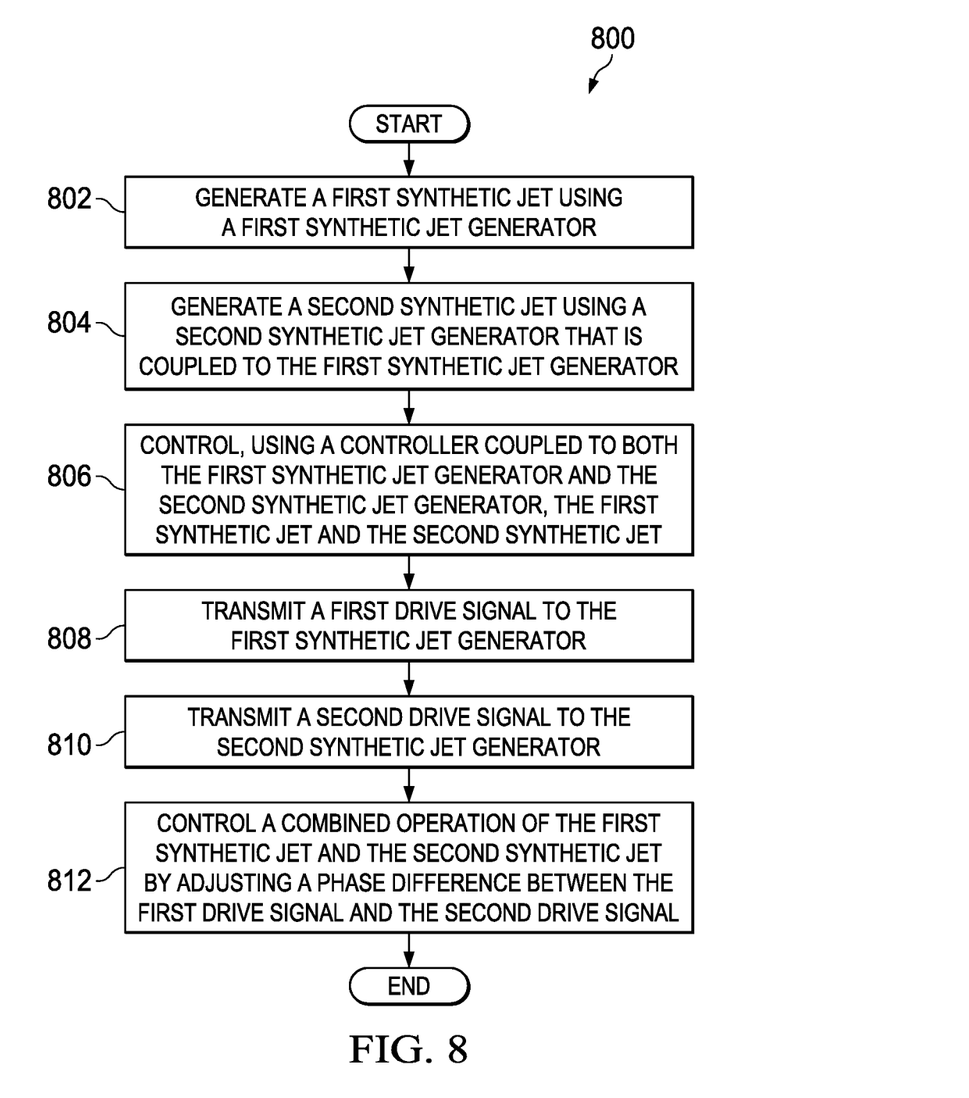
FIG. 8 is an illustration of a flowchart of a method for operating a synthetic jet generator in accordance with an illustrative embodiment.

FIG. 8 is an illustration of a flowchart of a method for operating a synthetic jet generator in accordance with an illustrative embodiment. Method 800 may be implemented using two or more synthetic jet generators, such as synthetic jet generator array 100 of FIG. 1, device 600 of FIG. 6, or device 700 of FIG. 7.

Method 800 includes generating a first synthetic jet using a first synthetic jet generator (operation 802). Method 800 then includes generating a second synthetic jet using a second synthetic jet generator that is coupled to the first synthetic jet generator (operation 804). Method 800 then includes controlling, using a controller coupled to both the first synthetic jet generator and the second synthetic jet generator, the first synthetic jet and the second synthetic jet (operation 806).

In method 800, controlling includes transmitting a first drive signal to the first synthetic jet generator (operation 808). In method 800, controlling also includes transmitting a second drive signal to the second synthetic jet generator (operation 810). In method 800, controlling also includes controlling a combined operation of the first synthetic jet and the second synthetic jet by adjusting a phase difference between the first drive signal and the second drive signal (operation 812). In one illustrative embodiment, the method may terminate thereafter.

Method 800 may be varied. For example, the controller may be further configured to control operation of the first synthetic jet generator by controlling only the phase difference. In another illustrative embodiment, method 800 may also include producing a predetermined velocity profile of a combination of the first synthetic jet and the second synthetic jet using a feedback signal from a feedback circuit, the feedback circuit coupled to the first synthetic jet generator, the second synthetic jet generator, and the controller.

In this case, method 800 may also include detecting, using a sensor connected to an aircraft, local aerodynamic stall characteristics of a fluid flow on a body of the aircraft. Then, method 800 may also include mitigating, using the combined operation of the first synthetic jet and the second synthetic jet, the local aerodynamic stall characteristics by producing the predetermined velocity profile.

In another illustrative embodiment, method 800 may also include driving both the first synthetic jet generator and the second synthetic jet generator at a single constant voltage amplitude. In still another illustrative embodiment, method 800 may also include increasing both a first maximum velocity of the first synthetic jet and a second maximum velocity of the second synthetic jet by changing the relative phase. In one specific example, the relative phase may be about one hundred and eighty degrees. However, the relative phase may vary between zero degrees and 360 degrees.

The illustrative embodiments described with respect to FIG. 8 may be further varied. Thus, the illustrative embodiments described with respect to FIG. 8 do not necessarily limit the claimed invention.

Turning now to FIG. 9, an illustration of a data processing system is depicted in accordance with an illustrative embodiment. Data processing system 900 in FIG. 9 is an example of a data processing system that may be used to in conjunction with the illustrative embodiments, such as line of synthetic jet generators 102 of FIG. 1, or any other device or technique disclosed herein. In this illustrative example, data processing system 900 includes communications fabric 902, which provides communications between processor unit 904, memory 906, persistent storage 908, communications unit 910, input/output unit 912, and display 914.

Processor unit 904 serves to execute instructions for software that may be loaded into memory 906. This software may be an associative memory, which is a type of content addressable memory, or software for implementing the processes described herein. Thus, for example, software loaded into memory 906 may be software for executing method 800 of FIG. 8, or for executing techniques described with respect to FIG. 1 through FIG. 7.

Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information, either on a temporary basis and/or a permanent basis. Storage devices 916 may also be referred to as computer-readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory drive, a rewritable optical disk, a rewritable magnetic tape, or some combination of the above mentioned devices. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either physical or wireless communications links, or both.

Input/output unit 912 allows for input and output of data with other devices that may be connected to data processing system 900. For example, input/output unit 912 may provide a connection for user input through a keyboard, a mouse, and/or some other suitable type of input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer-useable program code, or computer-readable program code that may be read and executed by a processor in processor unit 904. The program code in the different embodiments may be embodied on different physical or computer-readable storage media, such as memory 906 or persistent storage 908.

Computer-usable program code 918 is located in a functional form on computer-readable media 920 that is selectively removable and may be loaded onto or transferred to data processing system 900 for execution by processor unit 904. Computer-usable program code 918 and computer-readable media 920 form computer program product 922 in these examples. In one example, computer readable media 920 may be computer-readable storage media 924 or computer-readable signal media 926. Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

Alternatively, computer-usable program code 918 may be transferred to data processing system 900 using computer-readable signal media 926. Computer-readable signal media 926 may be, for example, a propagated data signal containing computer-usable program code 918. For example, computer-readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, computer-usable program code 918 may be downloaded over a network to persistent storage 908 from another device or data processing system through computer-readable signal media 926 for use within data processing system 900. For instance, program code stored in a computer-readable storage medium in a server data processing system may be downloaded over a network from the server to data processing system 900. The data processing system providing computer-usable program code 918 may be a server computer, a client computer, or some other device capable of storing and transmitting computer-usable program code 918.

The different components illustrated for data processing system 900 are not meant to provide architectural limitations to the manner in which different embodiments may be implemented. The different illustrative embodiments may be implemented in a data processing system including components, in addition to or in place of those, illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components, excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, or other suitable types of hardware devices. With this type of implementation, computer-usable program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run computer-usable program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer-readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, a cache. A memory may also be memory 906, found in an interface and memory controller hub that may be present in communications fabric 902.

Data processing system 900 may also include an associative memory. An associative memory may be in communication with communications fabric 902. An associative memory may also be in communication with, or in some illustrative embodiments, be considered part of storage devices 916. Additional associative memories may be present.

As used herein, the term "associative memory" refers to a plurality of data and a plurality of associations among the plurality of data. The plurality of data and the plurality of associations may be stored in a non-transitory computer-readable storage medium. The plurality of data may be collected into associated groups. The associative memory may be configured to be queried based on at least indirect relationships among the plurality of data, in addition to direct correlations among the plurality of data. Thus, an associative memory may be configured to be queried based solely on direct relationships, based solely on at least indirect relationships, as well as based on combinations of direct and indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data, in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which include but are not limited to forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk read-only memory (CD-ROM), compact disk-read/write (CD-R/W), or DVD.

Further, a computer-usable or computer-readable medium may contain or store a computer-readable or computer-usable program code, such that when the computer-readable or computer-usable program code is executed on a computer, the execution of this computer-readable or computer-usable program code causes the computer to transmit another computer-readable or computer-usable program code over a communications link. This communications link may use a medium that is, for example without limitation, physical or wireless.

A data processing system suitable for storing and/or executing computer-readable or computer-usable program code will include one or more processors coupled, directly or indirectly, to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output unit or input/output devices can be coupled to the system either directly or through intervening input/output controllers. These devices may include, for example, without limitation, keyboards, touch screen displays, or pointing devices. Different communications adapters may also be coupled to the system to enable the data processing system to become coupled to other data processing systems, remote printers, or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device comprising:
a resonant array of a plurality of synthetic jet generators where neighboring jet generators are coupled; and
a controller configured to control a relative phase of a corresponding plurality of drive signals to effect a change in a first jet emitted by a first synthetic jet generator of the plurality of synthetic jet generators by changing a given phase of a second jet emitted by a second synthetic jet generator of the plurality of synthetic jet generators, wherein the given phase is different from a phase of the first jet emitted by the first synthetic jet generator of the plurality of synthetic jet generators.

2. The device of claim 1, wherein the given phase is configured to cause a larger amplitude in each of the jets than is possible with a single jet.

3. The device of claim 1, wherein a resulting velocity profile of the jets is shaped depending on the relative phases to each jet generator of the plurality of synthetic jet generators.

4. The device of claim 1, wherein the second jet will only change when the first synthetic jet generator is driven.

5. The device of claim 1 further comprising:
an aircraft connected to the plurality of synthetic jet generators; and
a sensor connected to the aircraft and configured to detect local aerodynamic stall characteristics of a fluid flow on a body of the aircraft, and wherein the controller is further configured to adjust the first jet by changing a phase angle of the second jet generator to mitigate the local aerodynamic stall characteristics.

6. The device of claim 1, wherein the controller is further configured to control operation of the first synthetic jet generator of the plurality of synthetic jet generators by controlling only a relative phase difference between the corresponding plurality of drive signals.

7. The device of claim 1 further comprising:
a feedback circuit coupled to the first synthetic jet generator of the plurality of synthetic jet generators, the second synthetic jet generator of the plurality of synthetic jet generators, and the controller, and wherein the controller is further configured to use a feedback signal from the feedback circuit to control the first synthetic jet generator of the plurality of synthetic jet generators and the second synthetic jet generator of the plurality of synthetic jet generators to produce a predetermined velocity profile of a combination of the first synthetic jet of the plurality of synthetic jet generators and the second synthetic jet of the plurality of synthetic jet generators.

8. The device of claim 7 further comprising:
a housing containing the first synthetic jet generator of the plurality of synthetic jet generators, the second synthetic jet generator of the plurality of synthetic jet generators, and the controller;
an aircraft connected to the housing; and
a sensor connected to the aircraft and configured to detect local aerodynamic stall characteristics of a fluid flow on a body of the aircraft, and wherein the controller is further configured to mitigate the local aerodynamic stall characteristics by producing the predetermined velocity profile.

9. The device of claim 1, wherein the controller is further configured to drive both the first synthetic jet generator of the plurality of synthetic jet generators and the second synthetic jet generator of the plurality of synthetic jet generators at a single constant voltage amplitude.

10. The device of claim 1, wherein the controller is further configured to increase both a first maximum velocity of the first synthetic jet of the plurality of synthetic jet generators and a second maximum velocity of the second synthetic jet of the plurality of synthetic jet generators by changing a relative phase difference between the corresponding plurality of drive signals.

11. A system for phase tailoring resonant flow devices, comprising:
a data processing system using a controller configured to:
transmit a first drive signal to a first synthetic jet generator to produce a first synthetic jet;
transmit a second drive signal to a second synthetic jet generator to produce a second synthetic jet; and
control a combined operation of the first synthetic jet and the second synthetic jet by adjusting a phase difference between the first drive signal and the second drive signal.

12. The system of claim 11, wherein the controller is further configured to control operation of the first synthetic jet generator by controlling only the phase difference.

13. The system of claim 11, wherein the controller is further configured to produce a predetermined velocity profile of a combination of the first synthetic jet and the second synthetic jet using a feedback signal from a feedback circuit, the feedback circuit coupled to the first synthetic jet generator, the second synthetic jet generator, and the controller.

14. The system of claim 11, wherein the controller is further configured to:
detect, using a sensor connected to an aircraft, local aerodynamic stall characteristics of a fluid flow on a body of the aircraft; and
mitigate, using a combined operation of the first synthetic jet and the second synthetic jet, the local aerodynamic stall characteristics by producing the predetermined velocity profile.

15. The system of claim 11, wherein the controller is further configured to drive both the first synthetic jet generator and the second synthetic jet generator at a single constant voltage amplitude.

16. The system of claim 11, wherein the controller is further configured to increase both a first maximum velocity of the first synthetic jet and a second maximum velocity of the second synthetic jet by changing the phase difference.

17. A computer program product for training a primary machine learning model, the computer program product comprising:

a computer-readable storage media;

first program code, stored on the computer-readable storage media, for generating a first synthetic jet using a first synthetic jet generator;

second program code, stored on the computer-readable storage media, for generating a second synthetic jet using a second synthetic jet generator that is coupled to the first synthetic jet generator;

third program code, stored on the computer-readable storage media, for controlling, using a controller coupled to both the first synthetic jet generator and the second synthetic jet generator, the first synthetic jet and the second synthetic jet.

18. The computer program product of claim 17, wherein the third program code comprises:

program code, stored on the computer-readable storage media, for transmitting a first drive signal to the first synthetic jet generator;

program code, stored on the computer-readable storage media, for transmitting a second drive signal to the second synthetic jet generator; and program code, stored on the computer-readable storage media, for controlling a combined operation of the first synthetic jet and the second synthetic jet by adjusting a phase difference between the first drive signal and the second drive signal.

19. The computer program product of claim 17, further comprising:

fourth program code, stored on the computer-readable storage media, for producing a predetermined velocity profile of a combination of the first synthetic jet and the second synthetic jet using a feedback signal from a feedback circuit, the feedback circuit coupled to the first synthetic jet generator, the second synthetic jet generator, and the controller.

20. The computer program product of claim 17, further comprising:

fourth program code, stored on the computer-readable storage media, for detecting, using a sensor connected to an aircraft, local aerodynamic stall characteristics of a fluid flow on a body of the aircraft; and fifth program code, stored on the computer-readable storage media, for mitigating, using a combined operation of the first synthetic jet and the second synthetic jet, the local aerodynamic stall characteristics by producing the predetermined velocity profile.

21. The computer program product of claim 17, further comprising driving both the first synthetic jet generator and the second synthetic jet generator at a single constant voltage amplitude.

\* \* \* \* \*